United States Patent
Jacob

(10) Patent No.: US 11,016,786 B2
(45) Date of Patent: May 25, 2021

(54) SEARCH AUGMENTED MENU AND CONFIGURATION FOR COMPUTER APPLICATIONS

(71) Applicant: Microsoft Technology Licensing, LLC, Redmond, WA (US)

(72) Inventor: Suraj Jacob, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 243 days.

(21) Appl. No.: 15/637,008

(22) Filed: Jun. 29, 2017

(65) Prior Publication Data

US 2017/0364376 A1    Dec. 21, 2017

Related U.S. Application Data

(63) Continuation of application No. 13/297,235, filed on Nov. 15, 2011, now Pat. No. 9,697,016.

(51) Int. Cl.
*G06F 9/44* (2018.01)
*G06F 9/445* (2018.01)
*G06F 16/28* (2019.01)

(52) U.S. Cl.
CPC ........ *G06F 9/44505* (2013.01); *G06F 16/285* (2019.01)

(58) Field of Classification Search
CPC .................................................. G06F 9/44505
(Continued)

(56) References Cited

U.S. PATENT DOCUMENTS 5,900,861 A * 5/1999 Nickerson ................ G09G 5/02
345/601
6,810,410 B1 * 10/2004 Durham .............. G06F 9/44505
709/203

(Continued)

FOREIGN PATENT DOCUMENTS

CN         101390103 A     3/2009
CN         101755268 A     6/2010
(Continued)

OTHER PUBLICATIONS

"Integrated Search Method for Application Menu Items," Jan. 10, 2007, 5 Pages.

(Continued)

*Primary Examiner* — Syling Yen
(74) *Attorney, Agent, or Firm* — Fiala & Weaver P.L.L.C.

(57) ABSTRACT

Providing for search to facilitate discovery or access to configuration functions of a computer application is described herein. By way of example, metadata can be appended to configuration functions of the computer application. A matrix correlating subsets of metadata with related configuration functions can facilitate distinguishing respective configuration functions, or groups of related configuration functions based on the subsets of metadata. User search data can be referenced against the subsets of metadata. Respective subsets of metadata that satisfy a condition defined by a data matching function can be returned as a match, and configuration functions associated with matching metadata can be output in response to the search data. In some aspects, user-appended metadata is provided for user customization of configuration function searching, and in other aspects machine learning can be employed to derive user preferences from usage activity and search history, and tailor search results to predicted user preferences.

20 Claims, 11 Drawing Sheets

(58) Field of Classification Search
USPC .................................................. 707/740
See application file for complete search history.

(56) References Cited

U.S. PATENT DOCUMENTS

| | | | |
|---|---|---|---|
| 7,353,246 | B1 | 4/2008 | Rosen et al. |
| 7,505,954 | B2 | 3/2009 | Heidloff et al. |
| 7,505,965 | B2 | 3/2009 | Ivanov |
| 7,904,446 | B1 | 3/2011 | Srivastava |
| 8,117,198 | B2 | 2/2012 | Herlocker et al. |
| 8,510,668 | B1* | 8/2013 | Raskin .............. G06F 3/0484 715/767 |
| 8,607,166 | B2 | 12/2013 | Jalon et al. |
| 8,677,274 | B2 | 3/2014 | Runov et al. |
| 9,697,016 | B2 | 7/2017 | Jacob |
| 2004/0117783 | A1 | 6/2004 | Kaminsky et al. |
| 2005/0091346 | A1 | 4/2005 | Krishnaswami et al. |
| 2005/0289111 | A1 | 12/2005 | Tribble et al. |
| 2006/0155686 | A1* | 7/2006 | Peterson .............. G06F 3/0482 |
| 2007/0073656 | A1 | 3/2007 | Bandi |
| 2007/0083512 | A1 | 4/2007 | Pepin et al. |
| 2007/0180066 | A1 | 8/2007 | Sherwood et al. |
| 2008/0319958 | A1* | 12/2008 | Bhattacharya ........ G06F 16/242 |
| 2009/0044144 | A1 | 2/2009 | Morris |
| 2009/0282403 | A1 | 11/2009 | Poole et al. |
| 2010/0114851 | A1 | 5/2010 | Wernecke |
| 2010/0318968 | A1 | 12/2010 | Traut et al. |
| 2011/0010700 | A1* | 1/2011 | Lanner ................ G06F 9/44505 717/170 |
| 2011/0078569 | A1 | 3/2011 | Lorch et al. |
| 2014/0033192 | A1* | 1/2014 | Lorenz .................. G06F 9/451 717/171 |

FOREIGN PATENT DOCUMENTS

| | | |
|---|---|---|
| JP | 08-152987 A | 6/1996 |
| KR | 1020050077422 A | 8/2005 |
| RU | 2351088 C2 | 3/2009 |
| WO | 2012078360 A1 | 6/2012 |

OTHER PUBLICATIONS

"System Settings—KDE UserBase Wiki", Retrieved from https://userbase.kde.org/System_Settings, Jun. 17, 2013, 8 Pages.

"The Mechanism of a Searchable Menu System", Apr. 2009, 11 Pages.

"Office Action in Issued in Korean Patent Application No. 10-2014-7013000", dated Nov. 21, 2018, 3 Pages.

"International Search Report and Written Opinion Issued in European Patent application No. 12192801.4", dated Jun. 27, 2013, 8 Pages.

"Final Office Action Issued in U.S. Appl. No. 13/297,235", dated Sep. 5, 2013, 55 Pages.

"Final Office Action Issued in U.S. Appl. No. 13/297,235", dated Nov. 2, 2016, 78 Pages.

"Non Final Office Action Issued in U.S. Appl. No. 13/297,235", dated Jul. 15, 2016, 54 Pages.

"Non Final Office Action Issued in U.S. Appl. No. 13/297,235", dated Mar. 14, 2013, 45 Pages.

Hearst, Marti A . . . , "Design Recommendations for Hierarchical Faceted Search Interfaces", In Journal of ACM SIGIR Workshop on Faceted Search, Aug. 2006, 6 Pages.

Hornof, et al., "Cognitive Modeling Reveals Menu Search is Both Random and Systematic", Retrieved from http://citeseerx.ist.psu.edu/viewdoc/download?doi=10.1.1.37.5243&rep=rep1&type=pdf, Dec. 23, 2006, 8 Pages.

"Office Action Issued in European Patent Application No. 12192801.4", dated Dec. 12, 2016, 5 Pages.

"First Office Action Issued in Chinese Patent Application No. 201210458907.3", dated Jan. 30, 2015, 13 Pages.

"Second Office Action Issued in Chinese Application No. 201210458907.3", dated Sep. 23, 2015, 10 Pages.

"Third Office Action and Search Report Issued in Chinese Patent Application No. 201210458907.3", dated Mar. 14, 2016, 11 Pages.

"Office Action Issued in Australian Patent Application No. 2012339948", dated Apr. 19, 2017, 3 Pages.

"Notice of Allowance Issued in Russian Patent Application No. 2014119519", dated Oct. 18, 2016, 11 Pages.

"Office Action Issued in Russian Patent Application No. 2014119519", dated Jul. 20, 2016, 4 Pages.

"Office Action Issued in Japanese Patent Application No. 2014-542350", dated Sep. 2, 2016, 6 Pages.

"Office Action Issued in Mexican Patent Application No. MX/a/2014/005929", dated Oct. 14, 2016, 5 Pages.

"International Search Report and Written Opinion Issued in PCT Application No. PCT/US12/64254", dated Mar. 11, 2013, 10 Pages.

"Notice of Allowance Issued in Chinese Patent Application No. 201210458907.3", dated Jun. 16, 2016, 4 Pages.

"Notice of Allowance Issued in Japanese Patent Application No. 2014-542350", dated Feb. 3, 2017, 3 Pages.

"Notice of Allowance Issued in Australian Patent Application No. 2012339948", dated Jun. 14, 2017, 3 Pages.

"Notice of Allowance Issued in Mexican Patent Application No. MX/a/2014/005929", dated Jun. 22, 2017, 2 Pages. (W/o English Translation).

"Relevance feedback", Retrieved from https://en.wikipedia.org/wiki/Relevance_feedback on Oct. 31, 2011, 4 Pages.

"Office Action Issued in Brazilian Patent Application No. BR112014011610-5", dated Dec. 9, 2019, 5 Pages.

"First Office Action Issued in Indian Patent Application No. 3283/CHENP/2014", dated Jan. 16, 2020, 6 Pages "Extended European Search Report Issued in European Patent Application No. 20155407.8", dated Apr. 16, 2020, 9 Pages.

* cited by examiner

SEARCH AUGMENTED MENU AND CONFIGURATION FOR COMPUTER APPLICATIONS

CROSS-REFERENCE TO RELATED APPLICATIONS

The present application is a continuation of U.S. patent application Ser. No. 13/297,235, filed Nov. 15, 2011, the entirety of which is incorporated by reference herein.

TECHNICAL FIELD

The present application is related to usability features for menu and configuration functions of a computer application, and more particularly to search augmented menu and configuration functions for computer applications.

BACKGROUND

Software applications have a variety of mechanisms for providing and enhancing user experience of an application. Some applications are configured to enable a user to alter borders, shading and other visual aspects of an application's display. Some applications are configured to enable a user to alter sounds, music, ringtones and other auditory features of the application, and so on. Still other applications may provide options for changing a tactile interface in which a user may receive output information or provide input information to a computer and computer application (e.g., a touchpad screen). Generally speaking, user interface customization can be as rich and diverse as the variety of ways in which information can be received from or output to a user of a computer application.

As applications become more complex, the number of functions and functionality of a computer application can increase significantly. Take, for instance, a word processing application. Such an application will likely have functionality to facilitate generation of letters, postcards, documents, presentations, banners, signs, and so on. The application may contain different sets of default parameters for each of these different types of documents. Such parameters might include dimensions of document boundaries, dimensions of borders and margins, visual artwork, preconfigured text fields, and so on. In addition, many of these parameters could be user customizable, in which case the application will include a control interface for receiving user parameter values (e.g., a control dialogue box for borders and margins, etc.). In general, different application functionality and features have associated user options or preference settings for user customization of parameters associated with the functionality and features. These user options and preference settings are also referred to as configuration functions.

Some methods employed for organizing configuration functions of a computer application include creating menus, ribbons, dialogue boxes, toolbars, and the like, that organize configuration functions into various categories. For example, a set of menus might include a file menu, editing menu and viewing menu, among others, in which configuration functions related to those categories can be accessed. Other applications can organize related configuration functions in toolbars, or in pop-up boxes, whereas some applications employ a combination of these or like mechanisms for organizing configuration functions. Thus, some applications may configure some configurations functions in multiple ways. For instance, functionality accessible on an editing menu may also be available on an editing toolbar, and so on.

Although menus, toolbars and dialogue boxes provide a sophisticated way to organize configuration functions in a computer application, the sheer number of such functions can still overwhelm users, particularly those users who are unfamiliar with an application, or are familiar with a prior version of the application having a different organization. One problem in software development, for instance, is providing new application functionality and solving user concerns in a manner that is appealing to a wide base of users, with an interface that is easy to navigate. One deterrent in moving to a new version of a computer application is fear of losing productivity from lack of familiarity with the user interface. A challenge for software development in providing computer applications is to include new functionality, fix inoperable or ineffective functionality, while providing a pleasing user experience, without impacting productivity of users.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In particular aspects, disclosed is a system, comprising a reference component configured to access a set of metadata correlated with configuration functions of a computer application, an indexing component configured to distinguish respective subsets of the set of metadata that are associated with respective ones of the configuration functions; and a searching component that receives a set of search data, compares the set of search data with the subsets of the set of metadata, and identifies a matching subset of metadata that satisfies a condition pertaining to the search data defined by a function.

In other aspects, a method of providing access to configuration functions of an application is disclosed, the method comprising assigning respective sets of metadata to respective configuration functions of the application that are descriptive of respective names, uses or applications of the respective configuration functions; indexing the configuration functions and the assigned respective sets of metadata, receiving a configuration function search query; referencing the search query with respective sets of metadata and identifying one or more respective sets of metadata that satisfy a condition defined by a data matching function relative to the search query, and returning one or more configuration functions assigned to respective sets of metadata satisfying the condition.

In further aspects, the subject disclosure provides a computer-readable medium comprising instructions that, when executed by a processor, facilitate user access to configuration functions of an application; the instructions comprising assigning distinguishing metadata to respective configuration functions of an application, indexing the configuration functions and the distinguishing metadata, receiving a search query pertaining to configuration functions of the application, searching the distinguishing metadata to identify a subset of the distinguishing metadata correlated with the search query sufficient to satisfy a condition defined by a correlation function, and returning a configuration function associated with the subset of the distinguishing metadata in response to the search query.

According to various aspects of the subject disclosure, provided herein is user-enabled search coupled with accessing configuration functions of a computer application. In a particular aspect, metadata can be appended to configuration functions of the computer application. Respective sets of metadata can then be used to distinguish respective configuration functions, or groups of related configuration functions. A user can enter search data, which can be reference against the sets of metadata. Respective sets of metadata that satisfy a condition defined by a data matching function can be returned as a match, and configuration functions associated with matching metadata can be output in response to the search data.

In some non-limiting aspects of the subject disclosure, audio, visual or multimedia content can be provided in conjunction with search for configuration functions. The content can be configured to instruct a user how to access a configuration function through the user interface. Further, the content can be triggered upon selection of a particular configuration function among a list of configurations functions that are output in response to a search. Thus, by searching for and selecting a configuration function, a user indicates unfamiliarity with accessing the configuration function through the user interface. The audio/visual/multimedia content can supplement a user's mastery of the user interface of the computer application.

In still other aspects of the subject disclosure, configuration function search results can be returned as a list of links. Selection of a link can call the configuration function selected, thereby opening a dialogue box, drop-down menu, activating a toolbar function, etc., giving a user access to the configuration function. Thus, the search can facilitate rapid access to the desired configuration function, enhancing user productivity within the computer application.

In one or more additional aspects, metadata appended to application configuration functions can be customized based on user activity, or user preferences. In one such aspect, a user can provide user-metadata to be appended to a particular configuration function, thereby potentially modifying the likelihood of returning the configuration function in response to entry of search data related to the user-metadata. In another aspect, user activity within the computer application can be monitored and analyzed to generate additional metadata related to a particular user's use of the computer application. This metadata can be descriptive of how the user interacts with various aspects of the user interface, what options or preferences the user selects, or the like. This metadata can be appended to suitable configuration functions to enhance future search results based on the user activity. In at least one additional aspect, machine learning can be employed to derive the metadata or to conduct a search, providing a sophisticated set of algorithms to adapt computer application configuration functionality to a particular user of the computer application.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
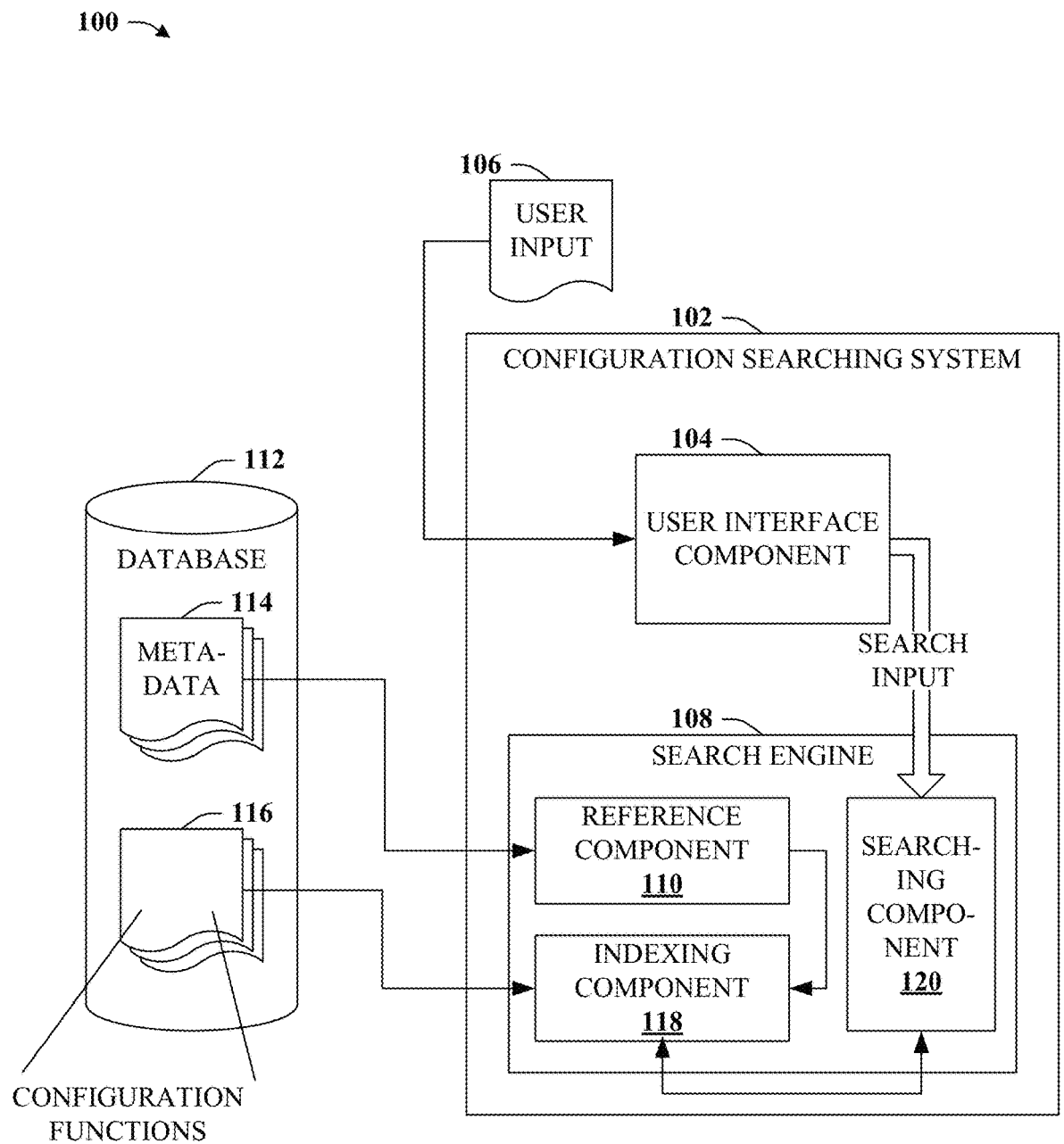
FIG. 1 illustrates a block diagram of an example system that provides search for configuration functions of an application according to aspects disclosed herein.

As mentioned briefly in the background section, organization of configuration functionality of a computer application can be a difficult task for software development engineers. Particularly, conflicting goals for a wide range of application users must be satisfied to achieve an acceptable application for a large market. Thus, for instance, a user interface should be aesthetically pleasing, as well as productive, enabling a user to rapidly access functionality that assists in performing tasks within the application. Moreover, user customizable settings, including user options, user preferences, and the like, in which users can input parameters to control operation, appearance or execution of application features, should be easily accessible without cluttering a user interface. These user customizable settings are referred to herein as configuration functions.

Successful computer applications often include diverse functionality coupled with a high degree of user configuration, while minimizing display clutter associated with the functionality and configuration functions. To minimize display clutter, user interface controls (e.g., dialogue boxes) related to functionality and configuration functions are often hidden in the display until accessed through the user interface. The access mechanisms can in turn be hidden behind drop-down menus, hideable/movable toolbars, or shortcut keys/key combinations, or the like. Familiarity with the access mechanisms can provide rapid access and implementation of powerful application functionality; sometimes associated with the vernacular title "power user". A typical power user is often loathe to switch to other applications with which they are less familiar, or even new versions of the same application, for fear of losing the high degree of productivity that user has established in an existing version of an application. Accordingly, reducing learning time while maximizing functionality and aesthetic appearance are common challenges in software application development.

To address these and related problems, the subject disclosure provides for searching in conjunction with accessing configuration functions of a computer application. Metadata can be appended to configuration functions to facilitate this searching. The application can include a search field for entering search data for configuration functions. Search data entered within the search field can be analyzed with regard to metadata appended to the configuration functions, and subsets of metadata determined to be related to the search data identified. One or more configuration functions associated with this identified metadata can be returned in response to the search. In some disclosed aspects, the search can return a list of links that provide access to a selected configuration function in response to such a selection. In other aspects, selection of a configuration function can initiate tutorial content instructing a user how to access the configuration function through a user interface of the computer application. According to one or more additional aspects, configuration function searching can be customized to a user or a user's use of an application, by incorporating user-related metadata with the configuration functions. In at least one aspect, searching can be enhanced with machine learning to provide a robust and sophisticated analysis of user preferences and usage to optimize searching and search results related to configuration functions of the computer application.

Referring now to the drawings, FIG. 1 illustrates a block diagram of an example system 100 configured to provide keyword-based search in conjunction with identifying or accessing configuration functions of a computer application, according to one or more aspects of the subject disclosure. Keyword-based search can comprise various search algorithms that receive data, compare the received data to a set of stored data, and derive similarities between subsets of the set of stored data and the received data, from which search results are compiled and output in response. Various mechanisms for searching are included within the meaning of the term "search", including network or web search engines (e.g., an Internet search engine, such as the Bing® search engine provided by Microsoft Corporation, and others), application-based search engines (e.g., a search utility contained within a particular application), or the like, which can be adapted to provide searching functionality as described herein.

As depicted, system 100 can comprise a configuration searching system 102 communicatively connected with a database 112 for storing data. Configuration searching system 102 can comprise a user interface component 104 configured to receive user input information, and configured to output user information to output media (e.g., a graphical display, audio speakers, tactile interface, and so on). Particularly, user interface component 104 can be configured to obtain user input 106 comprising search data. The user input can comprise text data (e.g., entered into a text field related to configuration function searching, e.g., see FIG. 4, infra), voice data converted to text data (e.g., in response to processing by a voice to text application), user interface selections (e.g., selected by keyboard entry, mouse selection, touchpad or touch screen selection), or other suitable user input mechanism.

User input 106 is received at user interface component 104. Where suitable, user interface component 104 can be configured to render search data contained in user input 106 into a different data form. For instance, text data in a particular language can be converted to ASCII data, machine code, or some other suitable data format, to facilitate analysis and processing of search data.

Configuration searching system 104 can further comprise a search engine 108 configured to utilize the search data received from user input 104 to identify one or more configuration functions of a computer application, related to the search data. To facilitate the search and identification, search engine 108 can comprise a reference component 110 configured to access a set of metadata stored in a metadata file 114 of database. The set of metadata stored in metadata file 114 can be appended by database 112 to configuration functions of the computer application stored in a configuration function file 116. For instance, subsets of metadata can be correlated with individual configuration functions, or groups of configuration functions, based on categories, names, descriptions, usage, contexts of usage, or the like, or suitable combinations thereof, of those configuration functions or groups of configuration functions. According to this relationship between metadata and configuration functions, an indexing component 118 can be configured to distinguish respective subsets of the set of metadata that are associated with respective ones of the configuration functions, or respective groups of the configuration functions. This can be achieved by exploiting differences in respective subsets of metadata stored in metadata file 114 that are correlated with individual configuration functions or groups of configuration functions, or combinations thereof. By receiving subsets of stored metadata from reference component 110, indexing component 118 can then access configuration functions from configuration functions file 116, and compile a matrix of configuration functions and metadata for a particular computer application. In some aspects of the subject disclosure, indexing component 118 can further compile a matrix of configuration functions and metadata, in conjunction with user preferences or user usage activity, referenced for a single computer application or for multiple computer applications, or suitable combinations thereof.

In addition to the foregoing, search engine 108 can comprise a searching component 120 configured to receive a set of search data from reference component 110 and to compare the set of search data with subsets of the set of metadata compiled by indexing component 118. Moreover, searching component 120 can be configured to identify a matching subset of metadata that satisfies a condition pertaining to the search data defined by a function. For instance, the condition can comprise satisfying a set of relevancy criteria established by the function, although other suitable conditions related to searching with respect to a set of search data can be utilized in addition or instead. Searching component 120 can then be configured to identify one or more configuration functions correlated with the subsets of metadata that satisfy the condition. These one or more configuration functions can be returned in response to the search.

In at least one aspect of the subject disclosure, search engine 108 can be configured to search at least in part based on a user initiating a configuration function search. For instance, an end user can entering search data can receive one set of configuration function results based on an end user classification, whereas an application developer can enter the search data and receive a second set of configuration function results based on a developer classification, or the like. Such a result can be achieved, for instance, when the set of metadata stored in metadata file 114 is categorized for different classifications of computer application users (e.g., including an end-user category and a developer category). In such case, searching component 120 can be configured to receive a category of user in conjunction with the set of search data and excludes from the comparison metadata inconsistent with the category of user. As an alternative, searching component can modify the condition defined by the function according to the category of user, causing the first set of metadata to satisfy the condition for the end user but not the developer, and causing the second set of metadata to satisfy the condition for the developer but not the end user, and so on. Other implementations known in the art or made known to one of skill in the art by way of the context provided herein are considered within the scope of the subject disclosure.

Figure 2:
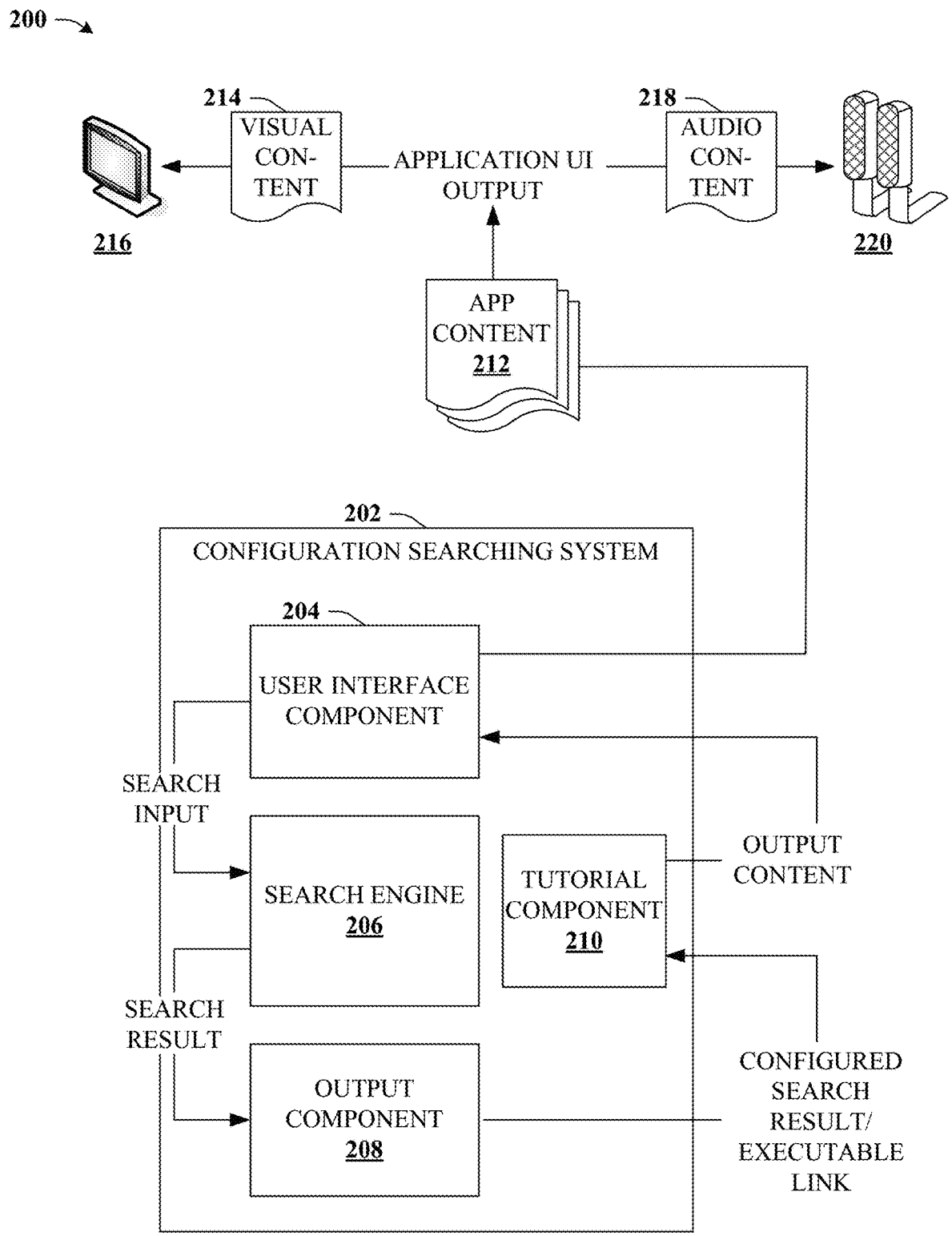
FIG. 2 depicts a block diagram of a sample system that provides multimedia output and interactive instruction for configuration functions.

FIG. 2 illustrates a block diagram of an example system 200 configured to provide search functionality in conjunction with computer application configuration functions, according to additional aspects of the subject disclosure. Particularly, system 200 can be configured to output search results in response to a configuration function search. The search results can be further configured to facilitate selection and access to a configuration function returned in response to the search. In at least one aspect, system 200 can facilitate instructing a user in accessing one or more configuration search functions through a user interface of an associated computer application, to improve user knowledge and mastery of the computer application.

System 200 can comprise a configuration searching system 202 that can perform a search of configuration functions and return one or more configuration functions in response to the search. A user interface component 204 can be configured to obtain search data from user data entry, which can be provided to a search engine 206. Search engine 206 can be substantially similar to search engine 108 of FIG. 1 according to some aspects of the subject disclosure; in other aspects, search engine 206 can include some, all or none of the features of search engine 108. According to various aspects, search engine 206 can employ the search data to retrieve one or more configuration functions related to the search data. The configuration functions can be provided as a search result to an output component 208.

Figure 10:
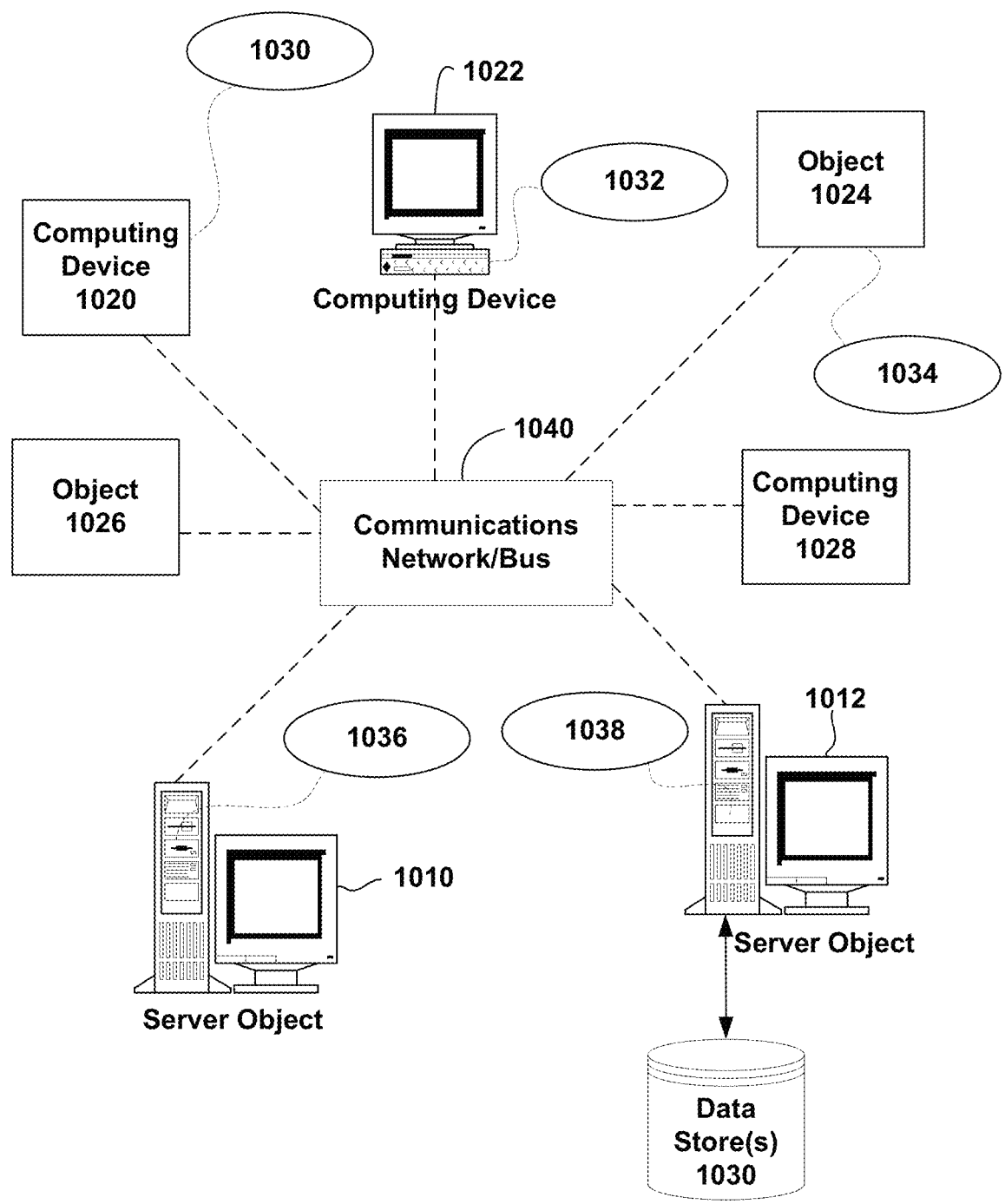
FIG. 10 depicts a block diagram of example non-limiting networked environments in which various aspects herein can be implemented.

Output component 208 can be configured to return the one or more configuration functions correlated with matching subsets of metadata identified by search engine 206, to user interface component 204 and an output media device of a computing device associated with configuration searching system 202 (e.g., see FIG. 10, infra). As an example, the configuration functions can be included within an application content message 212 comprising visual content 214 sent to a display device 216, or audio content 218 sent to an audio device 220 (e.g., speakers), or other media content sent to another media device (e.g., tactile information sent to a tactile user interface device). Additionally, in at least some aspects of the subject disclosure output component 208 can be further configured to return one or more executable links representing the one or more configuration functions in response to the search data. The executable link can be configured, for instance, to initialize the configuration function within the computer application in response to a selection of the executable link.

According to one or more alternative or additional aspects of the subject disclosure, configuration searching system 202 can comprise a tutorial component 210. Tutorial component 210 can be configured to execute audio, video, image or multimedia content that is configured to describe utilization of a configuration function associated with one or more configuration functions. Particularly, the content can describe how to access the configuration function(s) through a user interface of the computer application. In one instance, the content can be preceded by a user interface query requesting whether a user would like the content to be played, and execution of the content can be conditioned on acceptance by a user in response to the user interface query. In other instances, execution of the content can be set in a user preference (e.g., a configuration function) of the computer application. Examples of such content can include a video displaying movement of a mouse pointer to menus or toolbars on which a configuration function can be accessed, a set of pictures depicting accessing the configuration function in a user interface of the computer application, or the like.

Figure 3:
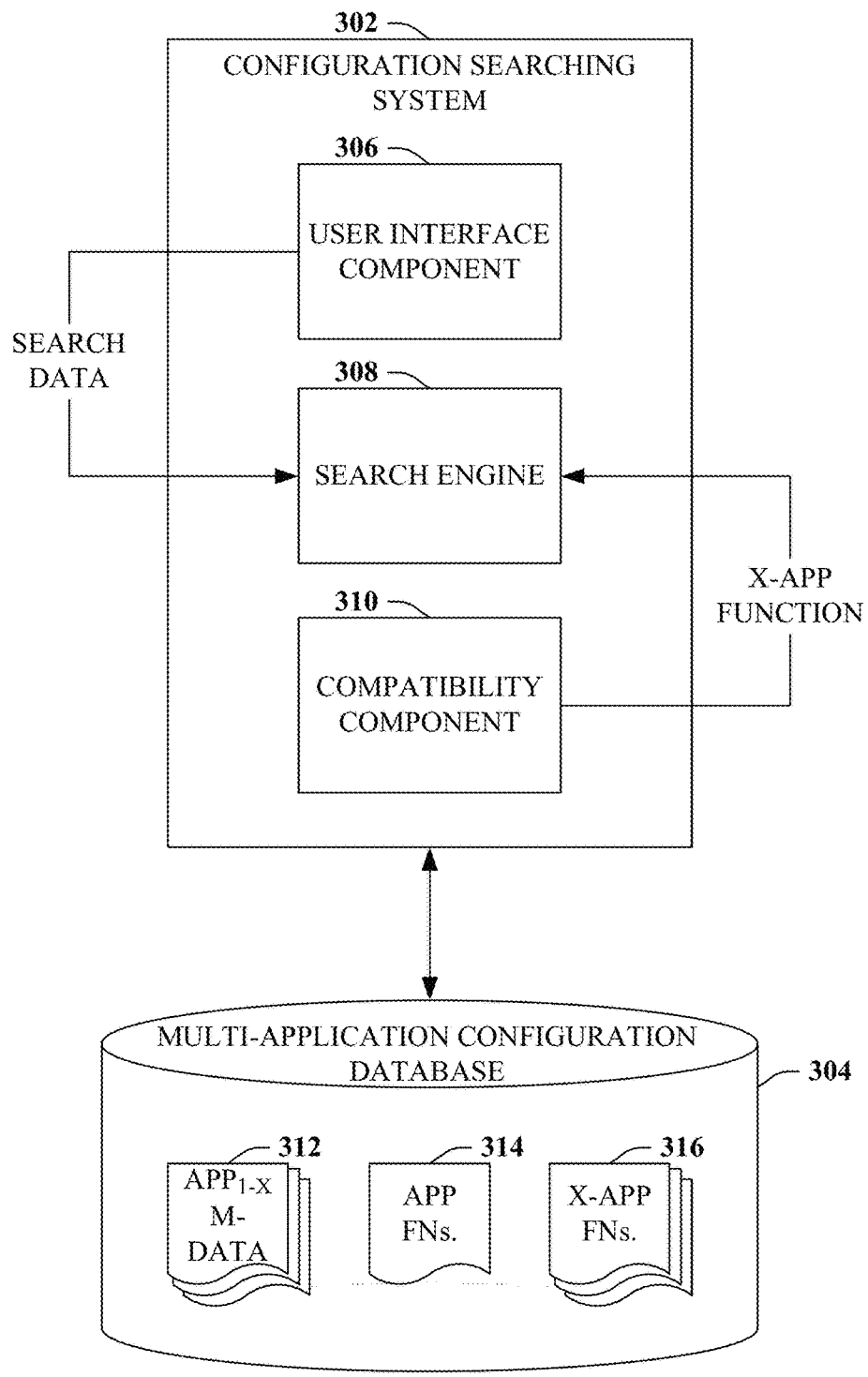
FIG. 3 illustrates a block diagram of an example system that provides multi-application support for configuration function searching according to some aspects.

FIG. 3 illustrates a block diagram of an example system 300 that provides searching for configuration functions across multiple computer applications according to further aspects of the subject disclosure. Additionally, system 300 can be configured to identify similar configuration functions among multiple applications and output one or more configuration functions of a first application based on search data related to a second application. System 300 therefore can facilitate user facility and acumen in the second application based at least in part on experience and knowledge of the first application.

System 300 can comprise a configuration searching system 302 communicatively connected with a multi-application configuration database 304. Configuration searching system 302 can comprise a user interface component 306 configured to receive user search data within, a pertaining to, a first application, and provide the search data to a search engine 308. Search engine 308 can employ a compatibility component 310 configured to access multi-application configuration database 304 in response to search engine 308 receiving the set of search data, and return to the search engine 308 a configuration function at least of a second computer application having metadata related to the set of search data.

To facilitate cross-application configuration searching, multi-application configuration database 304 can comprise metadata appended to configuration functions of multiple computer applications and store the metadata in a multi-application metadata file 312 (application$_{1-x}$ metadata, where x is a suitable integer greater than 1). Configuration functions for the multiple applications can be stored in an application configuration functions file 314. Additionally, multi-application configuration database 304 can also store configuration functions common to multiple applications, or similar or related configuration functions for the multiple applications as defined by a metadata similarity function, in a cross-application configuration function file 316. By storing relationships between metadata and configuration functions across the multiple applications, multi-application configuration database 304 can further be configured to cross-correlate configuration functions of the multiple computer applications having respective subsets of metadata that satisfy a condition defined by the similarity function. Thus, by referencing search data with the multi-application metadata stored in multi-application metadata file 312, configuration functions of multiple applications stored by multi-application configuration database 304 can be returned in response to a search, and provided to search engine 308 and user interface component 306 to return to a user in response to the search.

Figure 4:
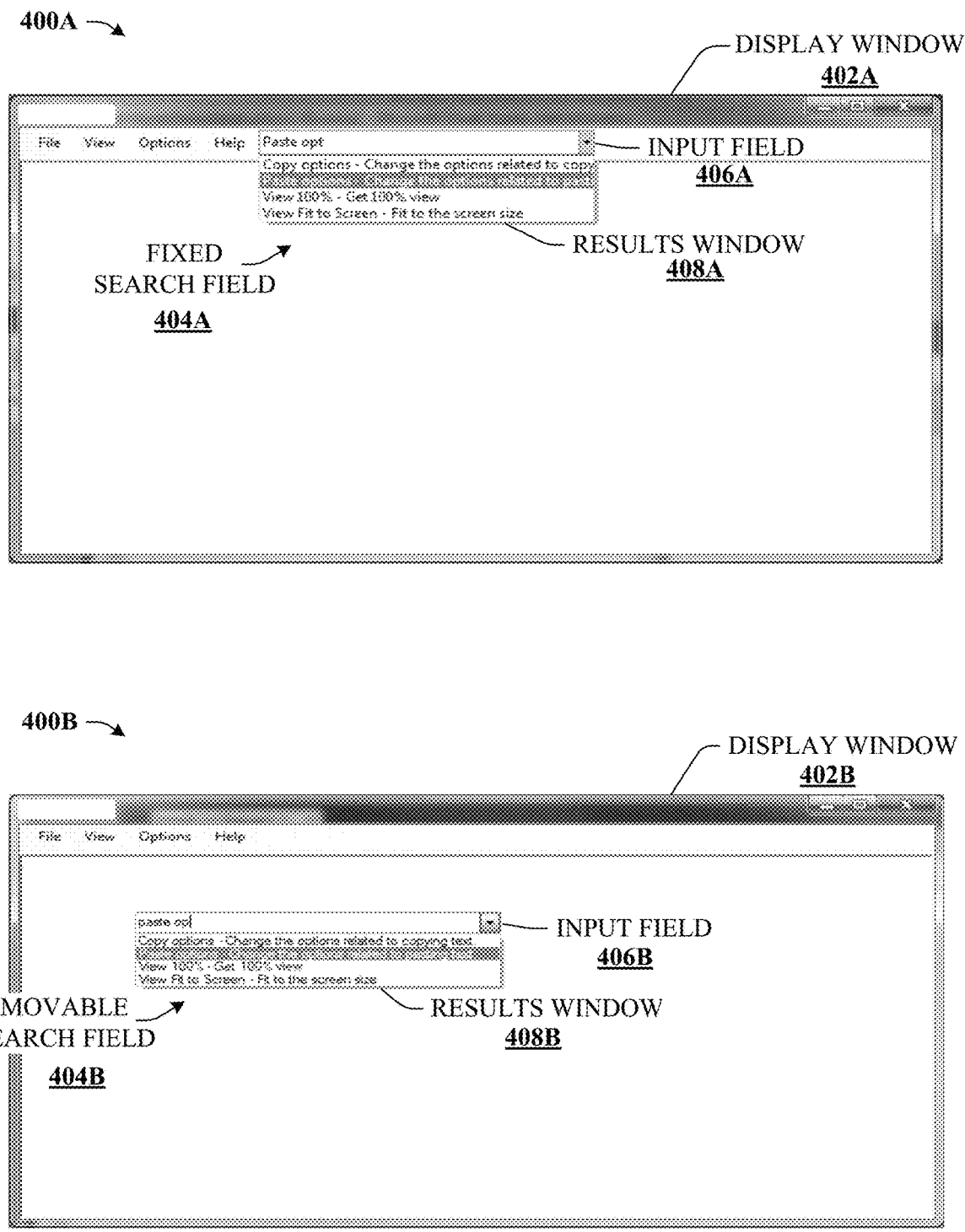
FIG. 4 depicts a block diagram of example implementations of configuration function searching according to further aspects.

FIG. 4 illustrates example user interface implementations of configuration function searching according to aspects disclosed herein. A fixed search implementation 400A is depicted at the top of FIG. 4. Fixed search implementation 400A comprises a display window 402A. Display window 402A can be a view window for a computer application in one aspect of the subject disclosure, whereas in other aspects, display window 402A can be a window spawned within the computer application, or can be spawned outside of the computer application by an operating system of a computer. As depicted, display window 402A can include a fixed search field 404A. Fixed search field 404A can be located adjacent to a menu bar, as depicted, or can be in another fixed location within display window 402A. Other locations can include a border (not depicted) at the bottom of display window 402A, or a border on a side of display window 402A. Fixed search field 404A can further comprise an input field 406A into which text can be entered by a user. Text entered into input field 406A can be employed, for instance, as keywords for searching configuration functions of a computer application(s), as described herein. Upon conducting the search, configuration function results matching the search are returned in a results window 408A. Results window 408A can be implemented as a drop-down window incorporating scrolling or other navigational techniques for viewing a subset of the configuration function results. In at least one aspect, configuration function results can comprise links, where the links are configured to execute a configuration function associated with a selected link.

At the bottom of FIG. 4 is depicted a movable search implementation 400B. Movable search implementation 400B comprises a display window 402B, which can be substantially similar to display window 402A, described above. Within display window 402B is a movable search field 404B. Movable search field 404B can be positioned throughout display window 402B. Repositioning can be accomplished by clicking and dragging movable search field 404B via a mouse input device, by specifying vertical and horizontal position within display window 402B, or the like. Movable search field 404B can be hidden or exposed, in some aspects of the subject disclosure, with a keyboard entry, mouse input, menu selection, toolbar selection, or a suitable combination thereof. When exposed, user text can be entered into an input field 406B, in a similar manner as described above with regard to input field 406A. Configuration function search results can be output in a results window 408B, which can include links configured to execute a configuration function in some aspects.

Figure 5:
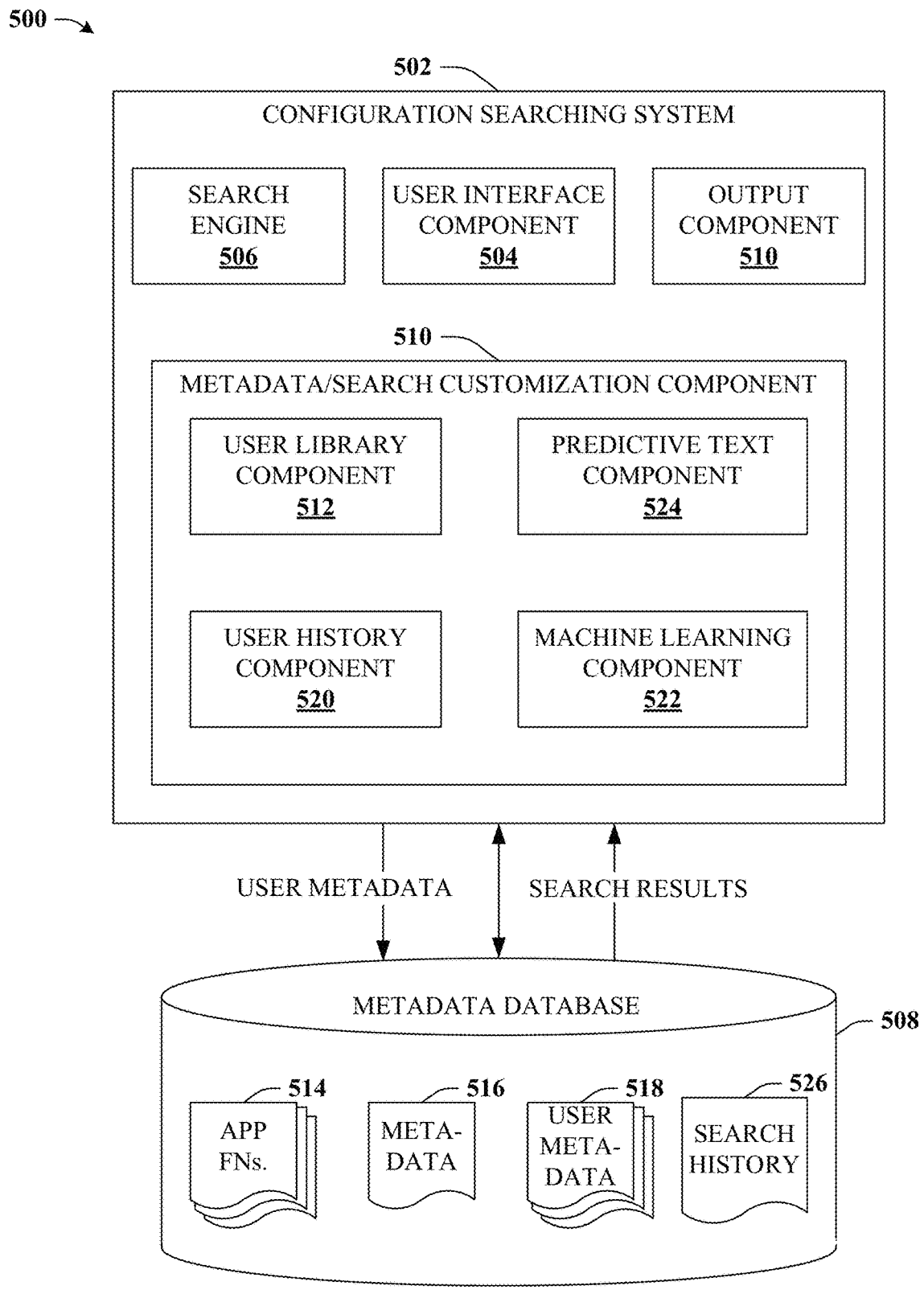
FIG. 5 illustrates a block diagram of an example system that provides user customization and machine learning for configuration function searching.

FIG. 5 illustrates a block diagram of an example system 500 configured to provide user customization of configuration function search capabilities of a computer application. Additionally, system 500 can incorporate machine learning functionality to provide search results tailored to preferences or usage history of a particular user. Thus, system 500 can facilitate configuration function search configured to adapt to a user's needs and preferences, providing a more robust user experience.

System 500 can comprise a configuration searching system 502 communicatively connected to a metadata database 508. Keywords, text or other search data can be received utilizing a user interface component 504 associated with a user interface of a processing device, computer device, electronic device, etc., pertaining to configuration searching system 502. The keywords, text or other search data can be employed as user search data by a search engine 506, which identifies configuration functions of a computer application(s) having associated metadata satisfying a condition defined by a data matching function. Identified configuration functions can be returned in response to the search by an output component 510 and user interface component 504.

Configuration searching system can further comprise a metadata/search customization component 510 configured to adapt configuration function searching to one or more users of an application(s). For instance, a user library component 512 can be employed that is configured to append a set of metadata stored in metadata database within a metadata file 516 with user metadata received in response to a user interface entry. This user metadata can be metadata actively entered by a user, and can be directed toward one or more configuration functions of one or more computer applications stored in a configuration functions file 514. The user metadata can be appended to metadata file 516, in one aspect, and related to the one or more configuration functions to which the user metadata is directed by user input. Thus, user library component 512 enables a user to input metadata for particular configuration functions. The user metadata and related configuration function association can affect the results of configuration function searching in a manner provided by a computer user, facilitating user-directed customization of the configuration function search.

In addition to the foregoing, metadata/search customization component 510 can be configured to monitor and analyze user activity relating to one or more computer applications and employ the analysis to make predictive determinations matching configuration function search results to estimated usage or preferences of an application user. User-specific metadata derived by metadata/search customization component 510 from the predictive determinations can be appended to selected configuration functions and stored in user metadata file 518, and optionally distinguished from user-supplied user metadata appended by user library component 512, discussed above. Additionally, a machine learning component 522 can employ one or more of a set of algorithms to make the predictive determinations, derive the user-specific metadata, or modify configuration function search results consistent with estimated usage or preferences of the application user.

In order to optimize configuration function search results, machine learning component 522 can utilize a set of models (e.g., metadata models, configuration function model, user usage models, data correlation models, user preference models, statistical models based on the foregoing, etc.) in connection with returning a set of configuration functions to user-supplied search data configured for user usage and preferences. The models can be based on a plurality of information (e.g., metadata stored in metadata file 516, user metadata stored in user metadata file 518, associations between metadata or user metadata and configuration functions stored in configuration function file 514, stored search results of prior configuration function searches stored in search history file 526, etc.). Optimization routines associated with machine learning component 522 can harness a model(s) that is trained from previously collected data, a model(s) that is based on a prior model(s) that is updated with new data, via model mixture or data mixing methodology, or a model(s) that is trained with seed data, and thereafter tuned in real-time by training with actual field data based on parameters modified as a result of error correction instances.

In addition, machine learning component 522 can employ optimization and machine reasoning techniques in connection with making determinations or inferences regarding optimization decisions, such as correlating user-supplied appended metadata and predictive user-related metadata with application usage history or configuration function search history,—either alone or in conjunction with one or more previous iterations of user input or user usage and user preference analysis, or the like. For example, machine learning component 522 can employ a probabilistic-based or statistical-based approach in connection with matching stored metadata with user search data. Inferences can be based in part upon explicit training of classifier(s) (not shown), or implicit training based on a data feedback loop (not depicted), and the like.

Machine learning component 522 can also employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers (e.g., methods referred to as "neural network" methodologies, fuzzy logic methodologies, and other approaches that perform data fusion, etc.) in accordance with implementing various aspects described herein. Methodologies employed by machine learning component 522 can also include mechanisms for the capture of logical relationships such as theorem provers or heuristic rule-based expert systems. Inferences derived from such learned or manually constructed models can be employed in other optimization techniques, such as linear and non-linear programming, that seek to maximize probabilities of error related to minimizing deviation of expected search results and provided search results. For example, maximizing an overall accuracy of expected search results and provided search results can be achieved through such optimization techniques.

According to a particular aspect of the subject disclosure, metadata/search customization component 510 can be configured as follows to implement the optimization and machine learning techniques describes above. A user history component 520 can be configured to track user configuration function activity relative to user use of one or more computer applications and record user configuration function activity at least as a function of time and of computer application. Additionally, machine learning component 522 can be configured to analyze recorded user configuration function activity and to employ optimization weights for the configuration functions or for a condition and data matching function employed to match user search data to subsets of metadata stored in metadata file 516 or subsets of user metadata stored in user metadata file 518. Weighting can be a result of one or more data models and in response to the analysis and can be a function of time and computer application. In a further aspect, metadata/search customization component 510 can comprise a predictive text component 524 configured to auto-fill a search input field with a proposed search result in response to text being entered into a search field (e.g., search field 406A or 406B of FIG. 4, infra). Predictive text component 524 can be further configured to update the proposed search result upon textual changes to the text currently entered. Still further, the proposed search result can be returned from data compiled from previous sets of search data, or from the currently entered text satisfying a correlation condition with respect to appended metadata, user-appended metadata or metadata derived from user usage of an application(s), or a suitable combination thereof. In at least one disclosed aspect, predictive text component 524 can be configured to return a proposed search result in the form of image content, audio content, video content or multimedia content, where content can be played/displayed or updated as data is entered into the search field.

The aforementioned diagrams have been described with respect to interaction between several systems, apparatuses, components, electronic circuits, or optoelectronic devices. It should be appreciated that such diagrams can include those components or systems specified therein, some of the specified components, or additional components. For example, a system could include configuration searching system 500 including search engine 506, reference component 110, indexing component 118 and searching component 120, in conjunction with multi-application configuration database 304. Sub-components could also be implemented as sub-components connected to other sub-components rather than included within a parent component. Additionally, it should be noted that two or more components could be combined into a single component providing aggregate functionality. For instance, reference component 202 can include indexing component 214 to facilitate accessing stored metadata and stored configuration functions, and relationships there between, and distinguishing respective configuration functions or groups of configuration functions by related subsets of metadata, by way of a single component. Components of the disclosed systems and apparatuses can also interact with one or more other components not specifically described herein but known by those of skill in the art, or made known to one of skill in the art by way of the context provided herein.

In view of the exemplary diagrams described supra, process methods that may be implemented in accordance with the disclosed subject matter will be better appreciated with reference to the flow chart of FIGS. 6-9. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Additionally, it should be further appreciated that the methods disclosed hereinafter and throughout this specification are capable of being stored on an article of manufacture to facilitate transporting and transferring such methods to an electronic device. The term article of manufacture, as used, is intended to encompass a computer program accessible from any computer-readable device, device in conjunction with a carrier, or storage medium.

Figure 6:
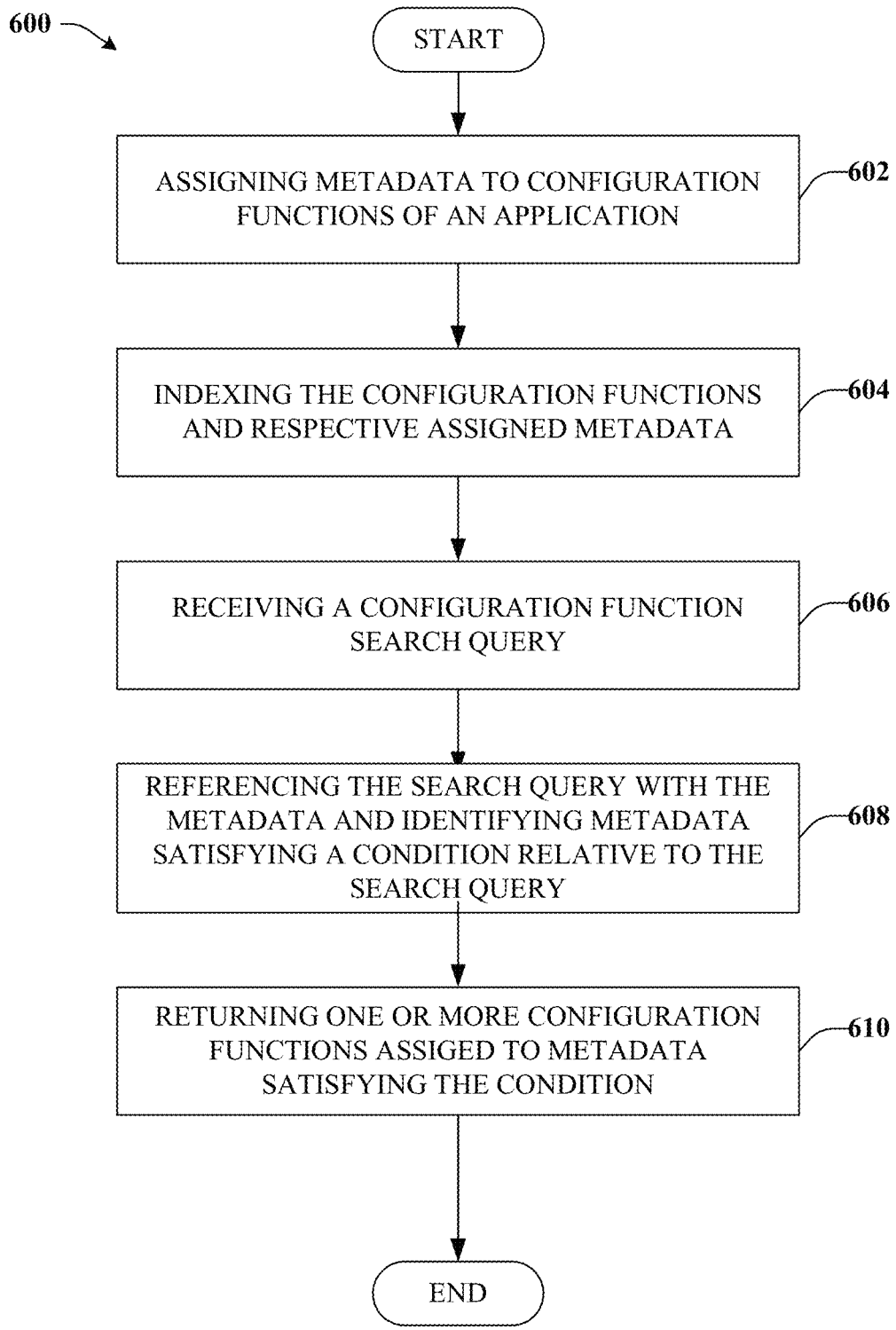
FIG. 6 illustrates a flowchart of an example method for providing user searching for computer application configuration functions according to other aspects.

FIG. 6 depicts a flowchart of a sample method 600 for providing search capabilities in conjunction with discovering and accessing configuration functions of a computer application, according to additional aspects of the subject disclosure. At 602, method 600 can comprise assigning respective sets of metadata to respective configuration functions of the computer application that are descriptive of respective names, uses or applications of the respective configuration functions. Moreover, at 604, method 600 can comprise indexing the configuration functions and the assigned respective sets of metadata. Indexing can comprise, for instance, generating a matrix of metadata and related configuration functions, optionally including qualitative or quantitative degree of relatedness. At 606, method 600 can comprise receiving a configuration function search query. The configuration function search query can comprise data entered into a user interface in conjunction with configuration function search functionality. At 608, method 800 can comprise referencing the search query with respective sets of metadata and identifying one or more respective sets of metadata that satisfy a condition defined by a data matching function relative to the search query. At 610, method 600 can comprise returning one or more configuration functions assigned to respective sets of metadata satisfying the condition.

Figure 7:
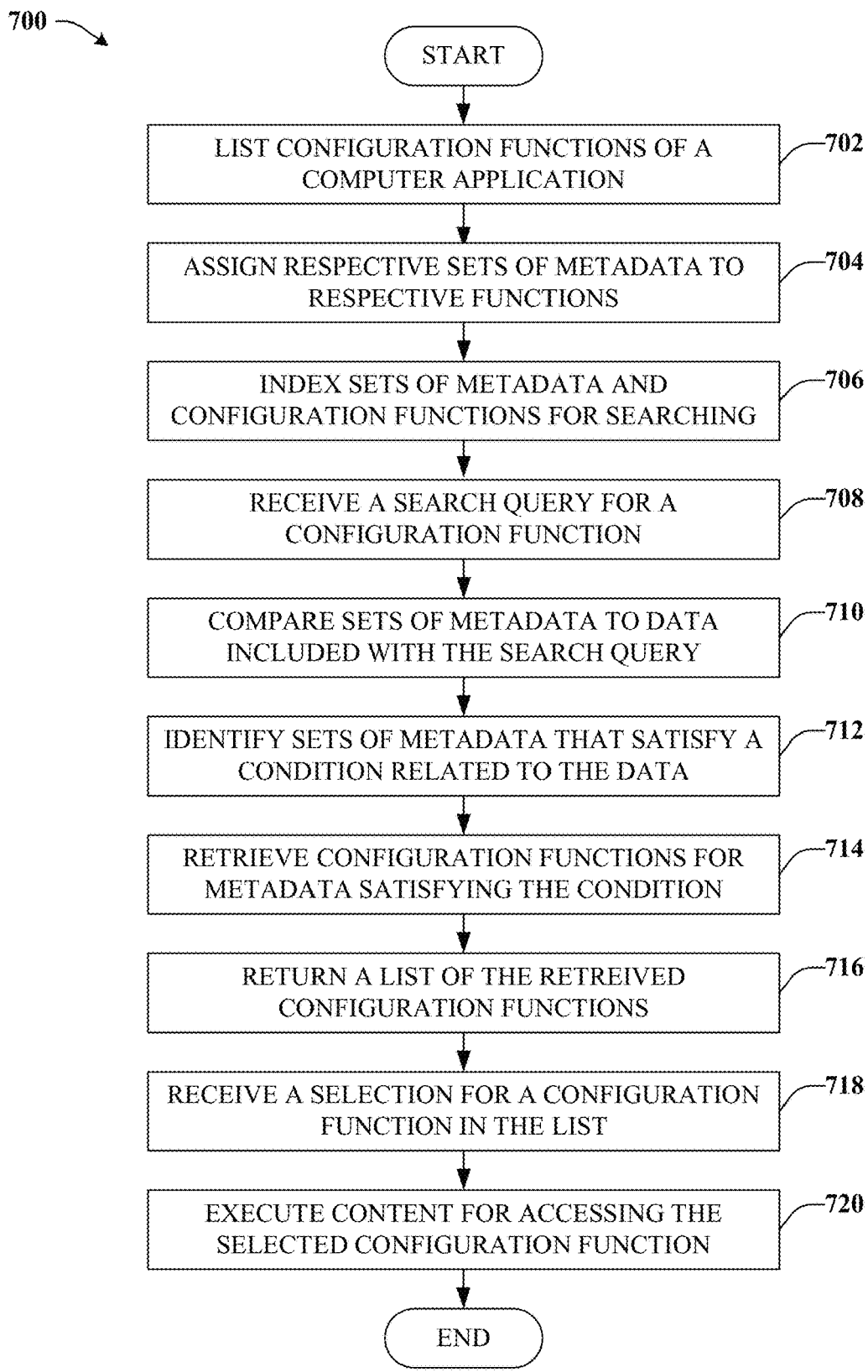
FIG. 7 illustrates a flowchart of a sample method for receiving user search data and identifying and returning related configuration functions in some aspects.

FIG. 7 illustrates a block diagram of an example method 700 according to particular aspects of the subject disclosure. At 702, method 700 can comprise listing configuration functions of a computer application. At 704, method 700 can comprise assigning respective sets of metadata to the respective functions. Metadata can be default metadata, utilizing function name data, function description data, function usage data, related help file data pertaining to the function, user-supplied data, or data derived from user usage of the computer application, or the like, or a suitable combination thereof. At 706, method 700 can comprise indexing sets of metadata and configuration functions for searching. At 708, method 700 can comprise receiving a search query for a configuration function. At 710, method 700 can comprise comparing sets of metadata to data included within the search query. At 712, method 700 can comprise identifying subsets of the metadata that satisfy a condition defined by a data matching function. At 714, method 700 can comprise retrieving configuration functions for respective subsets of the metadata satisfying the condition. At 716, method 700 can comprise returning a list of the retrieved configuration functions in response to receiving the search query. At 718, method 700 can comprise receiving a selection for a configuration function in the list. At 720, method 700 can comprise executing content associated with accessing the selected configuration function.

Figure 8:
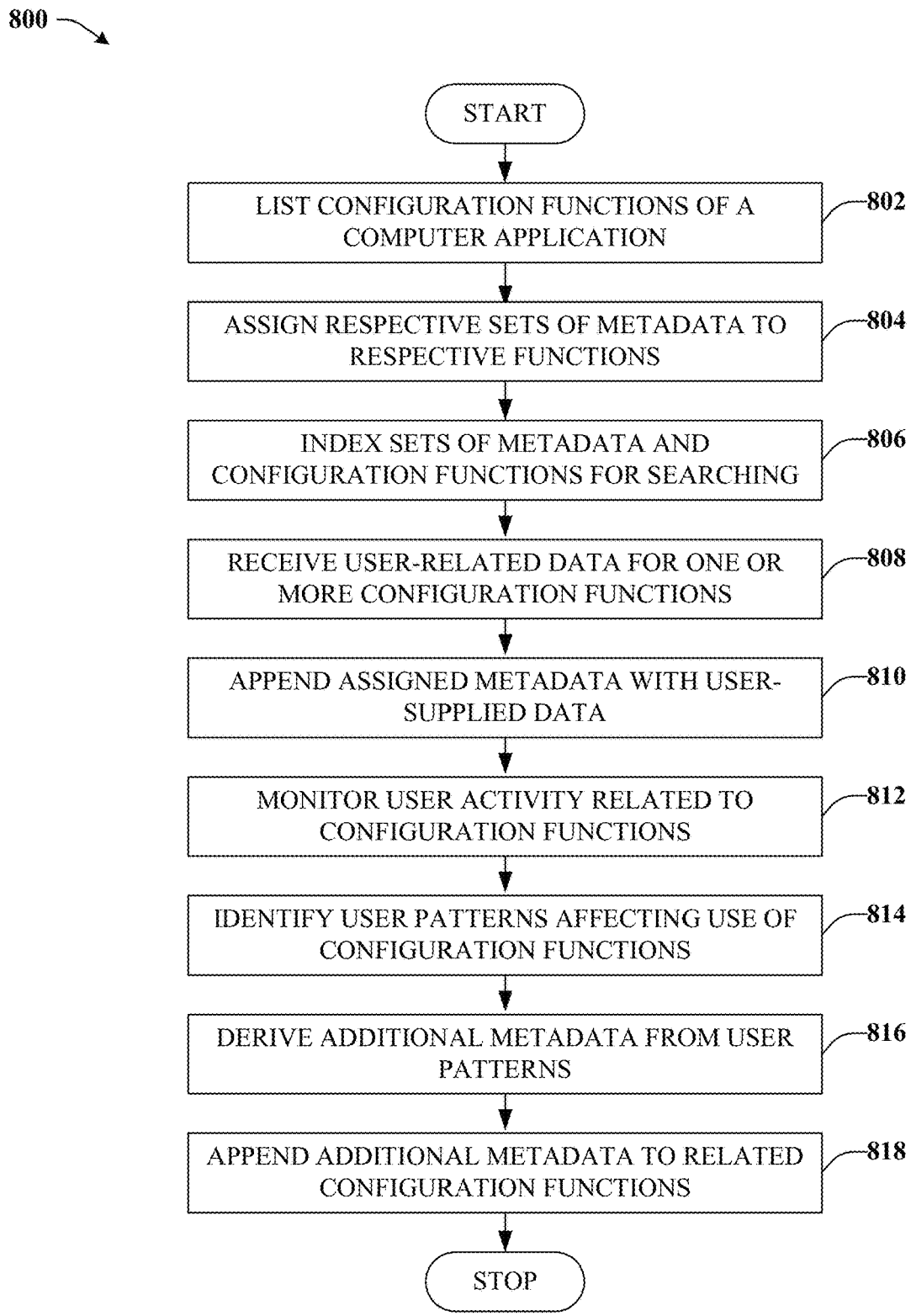
FIG. 8 depicts a flowchart of an example method for providing user customizable searching related to configuration functions according to further aspects.

FIG. 8 depicts a flowchart of an example method 800 according to one or more additional aspects of the subject disclosure. Particularly, method 800 can provide user customization for configuration function search capabilities. At 802, method 800 can comprise compiling a list of configuration functions of a set of computer applications. At 804, method 800 can comprise assigning respective sets of metadata to respective configuration functions. In at least one aspect, the respective sets of metadata can be assigned at least in part based on similarity of functions among respective computer applications of the set of computer applications. At 806, method 800 can comprise indexing sets of metadata and configuration functions for searching within a metadata matrix. At 808, method 800 can comprise receiving user-related data for one or more configuration functions. At 810, method 800 can comprise appending assigned metadata with user-related metadata. In at least one disclosed aspect, the user-related metadata can be supplied directly by a user of a computer application(s). In other aspects, the user-related metadata can be derived from user application activity, prior configuration function search data or search results, or a suitable combination thereof.

To provide metadata derived from user usage, at 812, method 800 can comprise monitoring user activity related to configuration functions of the set of computer applications. At 814, method 800 can comprise identifying user patterns affecting use of configuration functions. At 816, method 800 can comprise deriving additional metadata from user usage patterns. At 818, method 800 can comprise appending additional metadata to related configuration functions. In at least one aspect, the user-related metadata can be appended per user, and stored and searched separately in conjunction with a user identifier, user login, user status, user type (e.g., end-user, developer, etc.), or the like.

Figure 9:
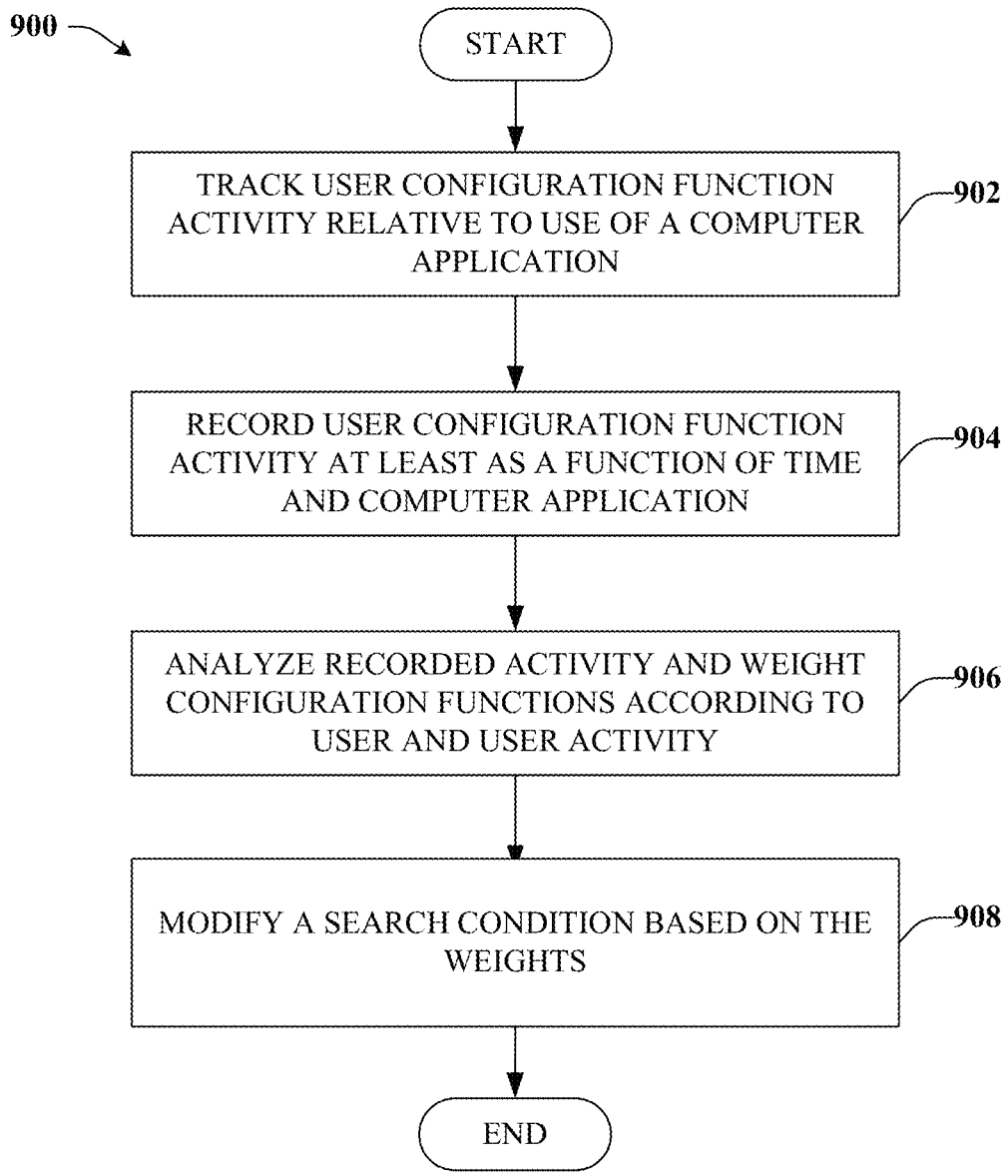
FIG. 9 depicts a flowchart of a sample method for providing searching adapted to a particular user's use of a computer application.

FIG. 9 illustrates a flowchart of a sample method 900 for providing intelligent predictive algorithms for configuration function search capabilities according to still other aspects of the subject disclosure. At 902, method 900 can comprise tracking user configuration function activity related to use of a computer application. At 904, method 900 can comprise recording user configuration function activity at least as a function of time and computer application. At 906, method 900 can comprise analyzing recorded activity and weighting configuration functions according to user identity and user activity. At 908, method 900 can comprise modifying a search condition or a data matching function at least in part from the weighted configuration functions to affect outcome of configuration function search results based on the analysis of recorded user activity.

EXEMPLARY NETWORKED AND DISTRIBUTED ENVIRONMENTS

One of ordinary skill in the art can appreciate that the various embodiments for search augmented menu and configuration functions described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the mechanisms for search augmented menu and configuration functions as described for various embodiments of the subject disclosure.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038 and data store(s) 1040. It can be appreciated that computing objects 1010, 1012, etc. and computing objects or devices 1020, 1022, 1024, 1026, 1028, etc. may comprise different devices, such as personal digital assistants (PDAs), audio/video devices, mobile phones, MP3 players, personal computers, laptops, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1042, either directly or indirectly. Even though illustrated as a single element in FIG. 10, communications network 1042 may comprise other computing objects and computing devices that provide services to the system of FIG. 10, and/or may represent multiple interconnected networks, which are not shown. Each computing object 1010, 1012, etc. or computing object or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the techniques for search augmented menu and configuration functions provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems for search augmented menu and configuration functions as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc., acting as servers provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1042 or bus is the Internet, for example, the computing objects 1010, 1012, etc. can be Web servers with which other computing objects or devices 1020, 1022, 1024, 1026, 1028, etc. communicate via any of a number of known protocols, such as the hypertext transfer protocol (HTTP). Computing objects 1010, 1012, etc. acting as servers may also serve as clients, e.g., computing objects or devices 1020, 1022, 1024, 1026, 1028, etc., as may be characteristic of a distributed computing environment.

EXEMPLARY COMPUTING DEVICE

As mentioned, advantageously, the techniques described herein can be applied to any device where it is desirable to search augmented menu and configuration functions, in a computing system. It can be understood, therefore, that handheld, portable and other computing devices and computing objects of all kinds are contemplated for use in connection with the various embodiments, i.e., anywhere that resource usage of a device may be desirably optimized. Accordingly, the below general purpose remote computer described below in FIG. 11 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 11:
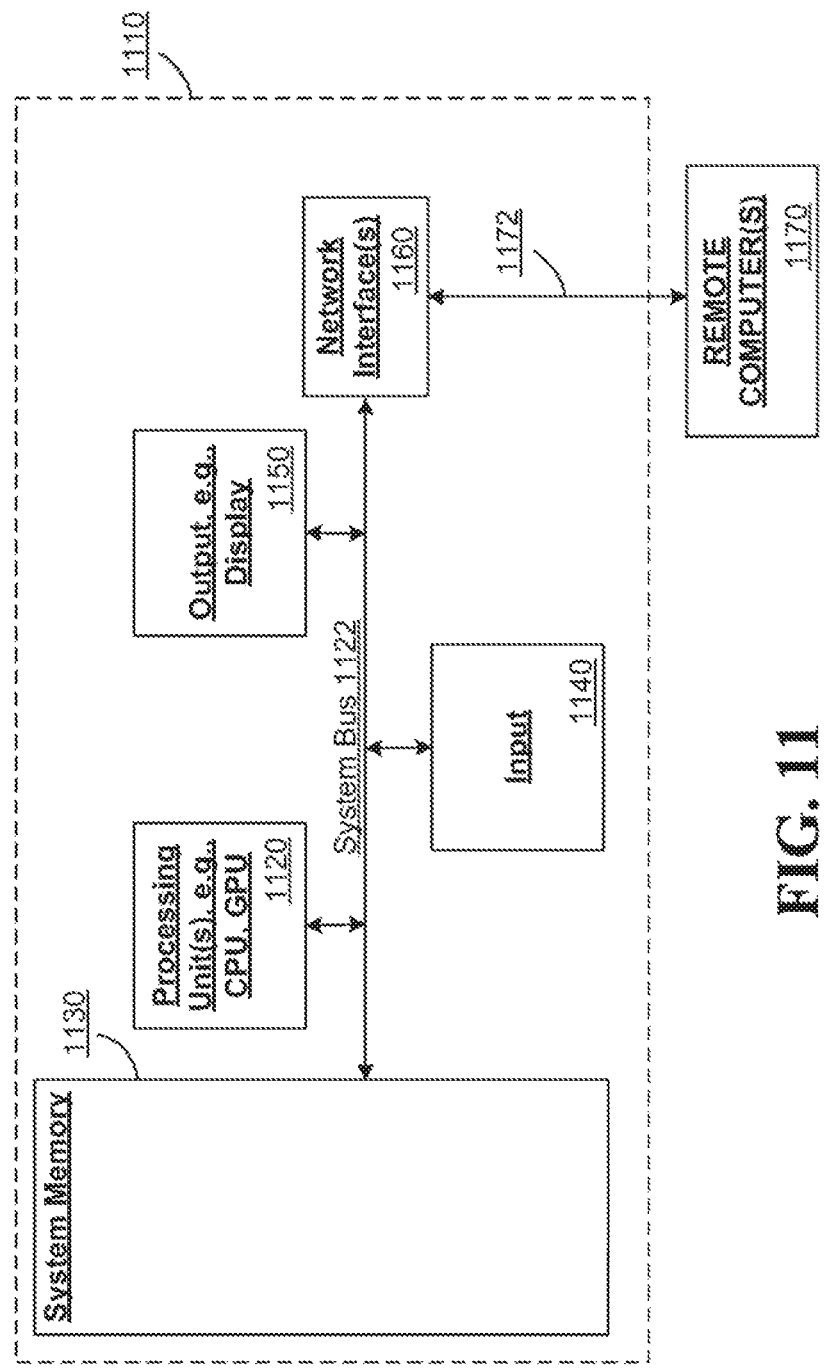
FIG. 11 illustrates a block diagram representing exemplary non-limiting computing system in which one or more aspects can be implemented.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. Neither should the computing system environment 1100 be interpreted as having any dependency or requirement relating to any one or combination of components illustrated in the exemplary computing system environment 1100.

As mentioned above, while exemplary embodiments have been described in connection with various computing devices and network architectures, the underlying concepts may be applied to any network system and any computing device or system.

In addition, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the various embodiments should not be limited to any single embodiment, but rather should be construed in breadth, spirit and scope in accordance with the appended claims.

What is claimed is:

1. A system, comprising:
   one or more processors; and
   one or more memory units that store software components for execution by the one or more processors, the software components including:
   a user history component that is configured to track user activity with respect to different user-customizable options of a computer application or different preference settings of the computer application;
   a user interface component that is configured to obtain text that is input by a user via a search input field displayed via a display window of a computer application;
   a predictive text component that is configured to generate search data by auto-filling the search input field of the user interface component with text that is predicted based at least on the tracked user activity responsive to the text being input by the user via the search input field;
   a search engine that is configured to receive the search data from the user interface component, compare the search data to metadata that is respectively correlated with the different user-customizable options of the computer application or the different preference settings of the computer application, and select one or more of the user-customizable options or preference settings of the computer application based on the comparison, each of the different user-customizable options and the different preference settings being user-searchable via the user interface component and the search engine; and
   an output component that is configured to provide a user interface control for presentation within the display window of the computer application, the user interface control providing access to the selected one or more of the user-customizable options or preference settings.

2. The system of claim 1, wherein the user interface control comprises one of:
   a menu;
   a ribbon;
   a dialog box; or
   a toolbar.

3. The system of claim 1, wherein the user interface control comprises a drop-down window that includes one or more links that correspond respectively to the selected one or more of the user-customizable options or preference settings of the computer application, each link being selectable to access the corresponding user-customizable option or preference setting.

4. The system of claim 1, wherein the text is input by the user via a text entry box in the display window of the computer application.

5. The system of claim 4, wherein the text entry box is located adjacent to a menu bar in the display window of the computer application.

6. The system of claim 1, wherein the computer application is a word processing application.

7. The system of claim 6, wherein the one or more user-customizable options or preference settings include one or more of:
   shading;
   dimensions of borders; or
   dimensions of margins.

8. The system of claim 1, wherein the search engine is configured to compare the search data to the metadata that is correlated with the different user-customizable options or preference settings of the computer application by performing a keyword search.

9. The system of claim 1, wherein the search engine is configured to select the one or more of the user-customizable options or preference settings of the application based on the comparison by:
   identifying metadata that satisfies a condition defined by a data matching function as matching metadata; and
   identifying user-customizable options or preference settings associated with the matching metadata.

10. The system of claim 1, wherein the search engine comprises an indexing component that generates a matrix of metadata and related user-customizable options or preference settings of the computer application.

11. A computer-implemented method for providing access to user-customizable options or preference settings of a computer application, comprising:
    tracking user activity with respect to different user-customizable options or different preference settings of the computer application;
    obtaining text that is input by a user via a search input field displayed via a display window of the computer application;
    generating search data by auto-filling the search input field with text that is predicted based at least on the tracked user activity responsive to the text being input by the user via the search input field;
    comparing the search data to metadata that is correlated with the different user-customizable options of the computer application or the different preference settings of the computer application;
    selecting one or more of the user-customizable options or preference settings of the computer application based on the comparison, each of the different user-customizable options and the different preference settings being user-searchable via the computer application; and providing a user interface control for presentation within the display window of the computer application, the user interface control providing the user with access to the selected one or more of the user-customizable options or preference settings of the computer application.

12. The computer-implemented method of claim 11, wherein the user interface control comprises one of:
   a menu;
   a ribbon;
   a dialog box; or
   a toolbar.

13. The computer-implemented method of claim 11, wherein the user interface control comprises a drop-down window that includes one or more links that correspond respectively to the selected one or more of the user-customizable options or preference settings of the computer application, each link being selectable to access the corresponding user-customizable option or preference setting.

14. The computer-implemented method of claim 11, wherein the text is input by the user via a text entry box in the display window of the computer application.

15. The computer-implemented method of claim 14, wherein the text entry box is located adjacent to a menu bar in the display window of the computer application.

16. The computer-implemented method of claim 11, wherein the computer application is a word processing application.

17. The computer-implemented method of claim 16, wherein the one or more user-customizable options or preference settings include one or more of:
   shading;
   dimensions of borders; or
   dimensions of margins.

18. A computer-readable storage device comprising instructions that, when executed by a computing device, facilitate user access to user-customizable options or preference settings of a computer application, the instructions comprising:

tracking user activity with respect to different user-customizable options or different preference settings of the computer application;

obtaining text that is input by a user via a search input field displayed via a display window of the computer application;

generating search data by auto-filling the search input field with text that is predicted based at least on the tracked user activity responsive to the text being input by the user via the search input field;

comparing the search data to metadata that is correlated with the different user-customizable options of the computer application or the different preference settings of the computer application;

selecting one or more of the user-customizable options or preference settings of the computer application based on the comparison, each of the different user-customizable options and the different preference settings being user-searchable via the computer application; and providing a user interface element for presentation within the display window of the computer application, the user interface element providing the user with access to the selected one or more of the user-customizable options or preference settings of the computer application.

19. The computer-readable storage device of claim 18, wherein the user interface element comprises one of:
   a menu;
   a ribbon;
   a dialog box; or
   a toolbar.

20. The computer-readable storage device of claim 18, wherein the user interface element comprises a drop-down window that includes one or more links that correspond respectively to the selected one or more of the user-customizable options or preference settings of the computer application, each link being selectable to access the corresponding user-customizable option or preference setting.

\* \* \* \* \*